US012389491B2

(12) United States Patent
Fan et al.

(10) Patent No.: US 12,389,491 B2
(45) Date of Patent: *Aug. 12, 2025

(54) METHOD AND DEVICE FOR DETERMINING TIMER CONFIGURATION

(71) Applicant: Telefonaktiebolaget LM Ericsson (publ), Stockholm (SE)

(72) Inventors: Rui Fan, Beijing (CN); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/520,017

(22) Filed: Nov. 27, 2023

(65) Prior Publication Data
US 2024/0172323 A1  May 23, 2024

Related U.S. Application Data

(63) Continuation of application No. 17/670,066, filed on Feb. 11, 2022, now Pat. No. 11,832,337, which is a
(Continued)

(30) Foreign Application Priority Data

Mar. 23, 2017 (WO) ................ PCT/CN2017/077915

(51) Int. Cl.
*H04W 76/28* (2018.01)
*H04L 1/1812* (2023.01)
(Continued)

(52) U.S. Cl.
CPC .......... *H04W 76/28* (2018.02); *H04L 1/1819* (2013.01); *H04L 1/1851* (2013.01);
(Continued)

(58) Field of Classification Search
CPC ..... H04W 76/28; H04W 72/04; H04W 72/12; H04W 52/02; H04W 72/0453;
(Continued)

(56) References Cited

U.S. PATENT DOCUMENTS 1,057,018 A * 3/1913 Truxal .................... B31B 50/88
101/245
8,320,287 B2 * 11/2012 Cai ........................ H04W 76/28
370/310
(Continued)

FOREIGN PATENT DOCUMENTS

| CA | 2682697 A1 | 10/2008 |
| CN | 101512947 A | 8/2009 |

(Continued)

OTHER PUBLICATIONS

Decision of Refusal, JP App. No. 2021-147964, Jan. 13, 2023, 9 pages (5 pages of English Translation and 4 pages of Original Document).
(Continued)

*Primary Examiner* — Man U Phan
(74) *Attorney, Agent, or Firm* — NICHOLSON DE VOS WEBSTER & ELLIOTT LLP

(57) ABSTRACT

Embodiments of the disclosure generally relate to determining configuration of a DRX timer. A wireless device determines a relationship between a DRX timer and different scheduling units and determines a time unit of the DRX timer based on the determined relationship. Then, the wireless device calculates a time interval indicated by the DRX timer based on the time unit.

20 Claims, 4 Drawing Sheets

Related U.S. Application Data continuation of application No. 16/859,734, filed on Apr. 27, 2020, now Pat. No. 11,259,358, which is a continuation of application No. 15/774,278, filed as application No. PCT/CN2018/079561 on Mar. 20, 2018, now Pat. No. 10,638,535.

(51) Int. Cl.
| | |
|---|---|
| *H04L 1/1829* | (2023.01) |
| *H04W 52/02* | (2009.01) |
| *H04W 72/0453* | (2023.01) |
| *H04W 72/12* | (2023.01) |

(52) U.S. Cl.
CPC ....... *H04L 1/1854* (2013.01); *H04W 52/0216* (2013.01); *H04W 72/0453* (2013.01); *H04W 72/12* (2013.01); *Y02D 30/70* (2020.08)

(58) Field of Classification Search
CPC .......... H04W 52/0216; H04W 72/1205; H04L 1/1854; H04L 1/1819; H04L 1/188; H04L 1/1851; H04L 1/1822; H04L 1/18; Y02D 30/70
USPC ........................................................ 370/329
See application file for complete search history.

(56) References Cited

U.S. PATENT DOCUMENTS

| | | | |
|---|---|---|---|
| 8,755,316 | B2 | 6/2014 | Aschan et al. |
| 8,797,924 | B2 * | 8/2014 | Tseng ................... H04L 5/0007 370/294 |
| 8,867,448 | B2 * | 10/2014 | Ji .......................... H04W 72/12 370/328 |
| 8,879,475 | B2 * | 11/2014 | Ji .......................... G01N 29/04 370/328 |
| 9,078,148 | B2 * | 7/2015 | Lee ....................... H04W 24/02 |
| 9,264,933 | B2 * | 2/2016 | He ..................... H04W 72/0466 |
| 9,363,847 | B2 | 6/2016 | Charbit et al. |
| 9,504,083 | B2 * | 11/2016 | Tseng ................... H04L 1/1848 |
| 9,560,664 | B2 * | 1/2017 | Tseng ............... H04W 52/0216 |
| 9,578,675 | B2 * | 2/2017 | Lee ....................... H04W 72/23 |
| 9,674,874 | B2 | 6/2017 | Wang et al. |
| 9,686,817 | B2 | 6/2017 | Heo et al. |
| 9,699,829 | B2 * | 7/2017 | Lee ....................... H04W 76/38 |
| 9,743,459 | B2 * | 8/2017 | Shah ..................... H04W 76/16 |
| 9,768,944 | B2 * | 9/2017 | Lee ....................... H04L 5/1469 |
| 9,867,078 | B2 * | 1/2018 | He ..................... H04W 72/0466 |
| 9,949,145 | B2 * | 4/2018 | Lee ....................... H04W 76/14 |
| 10,009,844 | B2 * | 6/2018 | Wang ............... H04W 52/0209 |
| 10,129,827 | B2 | 11/2018 | Latheef et al. |
| 10,149,244 | B2 | 12/2018 | Kim et al. |
| 10,349,464 | B2 * | 7/2019 | Eriksson ............... H04W 76/28 |
| 10,383,142 | B2 | 8/2019 | Lee |
| 10,602,567 | B2 * | 3/2020 | Bagheri ................ H04W 72/23 |
| 10,609,758 | B2 * | 3/2020 | Bagheri ................ H04W 72/21 |
| 10,645,751 | B2 * | 5/2020 | Yi .......................... H04W 76/28 |
| 10,873,934 | B2 * | 12/2020 | Babaei .............. H04W 72/0453 |
| 11,240,869 | B2 * | 2/2022 | Yang .................. H04W 28/0268 |
| 11,259,358 | B2 * | 2/2022 | Fan ....................... H04L 1/1819 |
| 2013/0301501 | A1 | 11/2013 | Olvera-Hernandez et al. |
| 2014/0071860 | A1 | 3/2014 | Susitaival et al. |
| 2014/0254444 | A1 | 9/2014 | Kim et al. |
| 2016/0119969 | A1 | 4/2016 | Vajapeyam et al. |
| 2016/0143048 | A1 | 5/2016 | Lee et al. |
| 2016/0286604 | A1 | 9/2016 | Heo et al. |
| 2017/0353289 | A1 | 12/2017 | Lee et al. |
| 2018/0070405 | A1 | 3/2018 | Yi et al. |
| 2018/0103504 | A1 | 4/2018 | Quan et al. |
| 2018/0139772 | A1 | 5/2018 | Ozturk et al. |
| 2018/0176934 | A1 | 6/2018 | Uchino et al. |
| 2018/0199287 | A1 * | 7/2018 | Lee ................... H04W 52/0216 |
| 2018/0332605 | A1 | 11/2018 | Pelletier |
| 2019/0045440 | A1 | 2/2019 | Wu et al. |
| 2022/0248496 | A1 | 8/2022 | Fan et al. |

FOREIGN PATENT DOCUMENTS

| | | |
|---|---|---|
| CN | 101567770 A | 10/2009 |
| CN | 101568168 A | 10/2009 |
| CN | 101925161 A | 12/2010 |
| CN | 102123447 A | 7/2011 |
| CN | 102204144 A | 9/2011 |
| CN | 103329611 A | 9/2013 |
| CN | 104468030 A | 3/2015 |
| CN | 104521281 A | 4/2015 |
| CN | 105340341 A | 2/2016 |
| CN | 106465273 A | 2/2017 |
| EP | 3739968 A1 | 11/2020 |
| JP | 2017-536036 A | 11/2017 |
| JP | 2018-517375 A | 6/2018 |
| WO | 2016/029736 A1 | 3/2016 |
| WO | 2016/064534 A1 | 4/2016 |
| WO | 2016/137783 A1 | 9/2016 |
| WO | 2016/197366 A1 | 12/2016 |
| WO | 2017/026159 A1 | 2/2017 |
| WO | 2017/038741 A1 | 3/2017 |

OTHER PUBLICATIONS

Decision to Grant a European Patent, EP App. No. 20174068.5, Apr. 7, 2022, 2 pages.
Decision to Grant a Patent, EP App. No. 18719737.1, May 4, 2020, 2 pages.
Decision to Grant a Patent, JP App. No. 2019-536854, Oct. 29, 2021, 5 pages (2 pages of English Translation and 3 pages of Original Document).
Ericsson, "Impact of sTTI on MAC timers and DRX", 3GPP TSG-RAN WG2 #96, Tdoc R2-168626, Nov. 14-18, 2016, pp. 1-7.
European Search Report and Search Opinion, EP App. No. 20174068.5, Aug. 31, 2020, 8 pages.
European Search Report and Search Opinion, EP App. No. 22166134.1, Oct. 7, 2022, 9 pages.
Extended European Search Report and Search Opinion, EP App. No. 18719737.1, May 9, 2019, 9 pages.
Final Office Action, U.S. Appl. No. 15/774,278, Sep. 30, 2019, 14 pages.
Final Office Action, U.S. Appl. No. 16/859,734, Aug. 11, 2021, 16 pages.
Final Office Action, U.S. Appl. No. 17/670,066, Apr. 27, 2023, 15 pages.
Huawei et al., "MAC Support of Multiple Numerologies", 3GPP TSG-RAN2 Meeting #Ad hoc, R2-1700083, Jan. 17-19, 2017, 5 pages.
Intention to Grant a Patent, EP App. No. 18719737.1, Jan. 30, 2020, 8 pages.
Intention to Grant, EP App. No. 20174068.5, Feb. 1, 2022, 6 pages.
International Preliminary Report on Patentability, PCT App No. PCT/CN2018/079561, Oct. 3, 2019, 5 pages.
International Search Report and Written Opinion for Application No. PCT/CN2018/079561, Jun. 8, 2018, 9 pages.
LG Electronics Inc., "Numerology Impact on DRX", 3GPP TSG-RAN WG2 Meeting #97, R2-1701540, Feb. 13-17, 2017, pp. 1-3.
LG Electronics Inc., "DRX with short TTI length", 3GPP TSG-RAN WG2 Meeting #97, R2-1701546, Feb. 13-17, 2017, pp. 1-3.
LG Electronics Inc., "Numerology Aspect in MAC", 3GPP TSG-RAN WG2 NR Ad Hoc, R2-1700426, Jan. 17-19, 2017, pp. 1-4.
LG Electronics Inc., "Numerology Impact on DRX", 3GPP Meeting #97, R2-1701540, Feb. 13-17, 2017, pp. 1-3.
Nokia, 3GPP TSG-RAN WG2 NR Adhoc, "Report of Email Discussion on [96#28][NR] MAC to Support Multiple Numerologies," R2-1700250, FS_NR_newRAT—Release 14, Jan. 17-19, 2017, 19 pages.
Non-Final Office Action, U.S. Appl. No. 15/774,278, Jun. 14, 2019, 11 pages.
Non-Final Office Action, U.S. Appl. No. 16/859,734, Apr. 13, 2021, 14 pages.
Non-Final Office Action, U.S. Appl. No. 17/670,066, Dec. 7, 2022, 15 pages.

(56) References Cited

OTHER PUBLICATIONS

Notice of Allowance, U.S. Appl. No. 15/774,278, Dec. 26, 2019, 9 pages.
Notice of Allowance, U.S. Appl. No. 16/859,734, Oct. 18, 2021, 9 pages.
Notice of Allowance, U.S. Appl. No. 17/670,066, Jul. 20, 2023, 13 pages.
Notice of Reasons for Refusal, JP App. No. 2021-147964, Aug. 19, 2022, 6 pages (3 pages of English Translation and 3 pages of Original Document).
Notification to Grant, CN App. No. 201880000431.4, Apr. 6, 2021, 3 pages (2 pages of English Translation and 1 page of Original Document).
Office Action, CN App. No. 201880000431.4, Aug. 27, 2020, 11 pages (2 pages of English Translation and 9 pages of Original Document).
Office Action, CN App. No. 201880000431.4, Mar. 1, 2021, 08 pages (2 pages of English Translation and 6 pages of Original Document).
Office Action, CN App. No. 202110607187.1, Aug. 9, 2023, 6 pages of Original Document Only.
Office Action, EP App. No. 20174068.5, Jul. 9, 2021, 6 pages.
Office Action, EP App. No. 20174068.5, Oct. 4, 2021, 6 pages.
Office Action, IN App. No. 201837016062, Jun. 26, 2020, 6 pages.
Office Action, JP App. No. 2019-536854, May 14, 2021, 5 pages (2 pages of English Translation and 3 pages of Original Document).
Office Action, JP App. No. 2019-536854, Jul. 6, 2020, 6 pages (3 pages of English Translation and 3 pages of Original Document).
Office Action, JP App. No. 2021-147964, Jun. 23, 2023, 5 pages (2 pages of English Translation and 3 pages of Original Document).
Office Action, EP App. No. 22166134.1, Jun. 4, 2025, 7 pages.
Oppo, "Harq Operation in NR", 3GPP TSG-RAN2 #97, R2-1700959, Feb. 13-17, 2017, pp. 1-3.

* cited by examiner

METHOD AND DEVICE FOR DETERMINING TIMER CONFIGURATION

CROSS-REFERENCE TO RELATED APPLICATIONS

This application is a continuation of application Ser. No. 17/670,066, filed Feb. 11, 2022 (now U.S. Pat. No. 11,832,337 issued Nov. 28, 2023), which is a continuation of application Ser. No. 16/859,734, filed Apr. 27, 2020 (now U.S. Pat. No. 11,259,358 issued Feb. 22, 2022), which is a continuation of application Ser. No. 15/774,278, filed May 7, 2018 (now U.S. Pat. No. 10,638,535 issued Apr. 28, 2020), which is the National Stage of International Application No. PCT/CN2018/079561, filed Mar. 20, 2018, which claims priority to International Application No. PCT/CN2017/077915, filed Mar. 23, 2017, which are hereby incorporated by reference.

TECHNICAL FIELD

Embodiments of the present disclosure generally relate to the field of communications, and more particularly, to a method and device for determining configuration of a discontinuous reception (DRX) timer.

BACKGROUND ART

Conventionally, in Long Term Evolution (LTE), when user equipment (UE) is configured with discontinuous reception, there are quite several timers need be configured to make the discontinuous reception work. The timers associated with DRX may be collectively referred to as DRX timers and may include, for example, onDurationTimer, drx-InactivityTimer, drx-RetransmissionTimer, and so on. In LTE, time units for all the DRX timers are the same as the scheduling unit, that is, a subframe or a Transmission Time Interval (TTI) having a time length of 1 ms.

In the next generation network, for instance, in New Radio (NR), the UE needs to support DRX as well and quite probably uses a DRX mechanism similar as in LTE. In other words, there may be quite several DRX timers need be configured to make DRX work in NR. Different from LTE, NR needs to support different numerologies and/or TTI lengths. The absolute time durations of different numerologies/TTI lengths are different. By way of example, for a numerology of 15 kHz sub-carrier spacing (SCS), the corresponding TTI length is 1 ms. For a numerology of 30 kHz SCS, its TTI length is 0.5 ms.

For NR, a TTI may have a shorter transmission duration which comprises less Orthogonal Frequency Division Multiplexing (OFDM) symbols than a normal TTI comprising 14 OFDM symbols. For instance, a UE may be configured to be scheduled in slots comprising 7 OFDM symbols instead of in a normal TTI comprising 14 OFDM symbols. An even shorter slot may be used as well, for example, a mini-slot including 2 OFDM symbols.

If the DRX timer in NR is configured in the same way as in LTE, i.e. the time unit for all timers is set according to the same TTI length, it would cause some confusion. More specifically, since the scheduling unit for the numerology of 15 kHz is 1 ms while the scheduling unit for the numerology of 30 kHz is 0.5 ms, if a DRX timer has a value of 5, it indicates 5 ms for a numerology of 15 kHz but indicates 2.5 ms for a numerology of 30 kHz. In such case, the UE may be unclear about the time interval actually indicated by the DRX timer, when the DRX timer should be active, or when the DRX timer should be sleep. This would cause a mismatching issue between the network (NW) side and the UE. For example, the UE may miss the scheduling from the NW when it is sleeping but the NW thinks it is active, or may waste its power when it is actually active but the NW thinks it is sleeping. As such, transmission efficiency and network performance would be reduced.

SUMMARY OF THE INVENTION

In general, embodiments of the present disclosure provide a solution for solving the DRX timer mismatching issue as discussed above.

In a first aspect, a method implemented at a wireless device is provided. The wireless device determines a relationship between a DRX timer and different scheduling units and determines a time unit of the DRX timer based on the determined relationship. Then, the wireless device calculates a time interval indicated by the DRX timer based on the time unit. The corresponding computer program is also provided.

In one embodiment, determining the relationship of the DRX timer and different scheduling units may comprise: determining whether the DRX timer needs to be aligned with respect to the different scheduling units.

In one embodiment, determining the time unit of the DRX timer may comprise: in response to determining that the DRX timer needs to be aligned with respect to the different scheduling units, performing at least one of: determining the time unit of the DRX timer as a predefined value; determining the time unit of the DRX timer based on a predefined numerology; determining the time unit of the DRX timer based on a currently used numerology; and determining the time unit of the DRX timer based on an indication received from a network device, the indication indicating a value of the time unit configured by the network device.

In one embodiment, determining the time unit of the DRX timer based on a currently used numerology may comprise: obtaining information about numerologies used by a primary cell and a secondary cell of the wireless device; and determining the time unit of the DRX timer based on the numerology used by the primary cell.

In one embodiment, determining the time unit of the DRX timer may comprise: in response to determining that the DRX timer does not need to be aligned with respect to the different scheduling units, obtaining information about numerologies used by different carriers; and determining time units of the DRX timer for the different carriers based on the numerologies.

In one embodiment, determining the time unit of the DRX timer may comprise: in response to determining that the DRX timer does not need to be aligned with respect to the different scheduling units, obtaining information about scheduling units used by different Hybrid Automatic Repeat request (HARQ) processes; and determining time units of the DRX timer for the different HARQ processes based on the information about scheduling units.

In one embodiment, determining the time unit of the DRX timer may comprise: in response to determining that the DRX timer does not need to be aligned with respect to the different scheduling units, obtaining information about scheduling units used by different HARQ transmissions in a HARQ process; and determining time units of the DRX timer for the different HARQ transmissions based on the information about scheduling units.

In a second aspect, an apparatus implemented at a wireless device is provided. The apparatus includes a determining unit and a calculating unit. The determining unit is configured to determine a relationship between a DRX timer and different scheduling units, and determine a time unit of the DRX timer based on the determined relationship. The calculating unit is configured to calculate a time interval indicated by the DRX timer based on the time unit.

In a third aspect, a wireless device is provided. The wireless device includes: a processor and a memory. The memory contains instructions executable by the processor, whereby the processor being adapted to cause the wireless device to perform the method according to the first aspect of the present disclosure.

According to embodiments of the present disclosure, the wireless device determines a time unit of the DRX timer according to its relationship with respect to different scheduling units. As such, there would be a common understanding between a network device and a terminal device of the time duration indicated by the DRX timer when the UE supports multiple numerologies/TTI lengths. Communication between the network device and the terminal device can be performed based on the common understanding of the DRX timer. In this way, transmission efficiency and network performance can be effectively improved.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
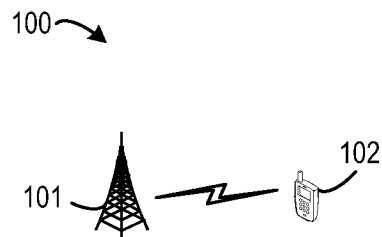
FIG. 1 shows a schematic diagram 100 of a wireless communication network.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "wireless device" refers to a network device or a terminal device in a wireless communication network.

The term "network device" refers to a device in a wireless communication network via which a terminal device accesses the network and receives services therefrom. The network device refers a base station (BS), an access point (AP), a Mobile Management Entity (MME), Multi-cell/Multicast Coordination Entity (MCE), a gateway, a server, a controller or any other suitable device in the wireless communication network. The BS may be, for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth.

Yet further examples of network device include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, UE, or other suitable device. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

The terminal device may support device-to-device (D2D) communication, for example by implementing a 3GPP standard for sidelink communication, and may in this case be referred to as a D2D communication device.

As yet another specific example, in an Internet of Things (JOT) scenario, a terminal device may represent a machine or other device that performs monitoring and/or measurements, and transmits the results of such monitoring and/or measurements to another terminal device and/or a network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment that is capable of monitoring and/or reporting on its operational status or other functions associated with its operation.

As used herein, the singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Now some exemplary embodiments of the present disclosure will be described below with reference to the figures. Reference is first made to FIG. 1, which shows a schematic diagram 100 of a wireless communication network. There illustrates a network device 101 and a terminal device 102 in the wireless communication network.

It is to be understood that the configuration of FIG. 1 is described merely for the purpose of illustration, without suggesting any limitation as to the scope of the present disclosure. Those skilled in the art would appreciate that the wireless communication network 100 may include any suitable number of terminal devices and/or network devices and may have other suitable configurations. In some embodiments, the network device 101 may communicate with one or more terminal devices other than the terminal device 102.

In the wireless communication network shown in FIG. 1, the concept of discontinuous reception (DRX) is employed for saving power. DRX can be used to enable a wireless device, such as the terminal device 102, to discontinuously monitor a control channel, such as the physical downlink control channel (PDCCH) communicated from a transmission station such as the network device 101. The discontinuous monitoring can provide significant power savings at the terminal device 102 since the receiver at the terminal device 102 can be turned off.

Conventionally, time units for all DRX timers are the same as the scheduling unit, that is, a subframe or a TTI having a time length of 1 ms. However, if a wireless device supports a plurality of numerologies and/or scheduling units, the wireless device may be unclear about time intervals actually indicated by the DRX timers, respectively. The network device and the terminal device cannot have a common understanding of the time duration indicated by the same DRX timer. As such, the mismatching issue of the DRX timer occurs, and transmission efficiency and network performance are reduced.

In order to solve the above and other potential problems, embodiments of the present disclosure provide solutions for solving the DRX timer mismatching issue. In the proposed solution, a wireless device determines relationship between a DRX timer and different scheduling units (that is, different TTI lengths). From the relationship, the wireless device may understand whether the DRX timer needs to be aligned with respect to the different scheduling units. Then the wireless device determines a time unit of a DRX timer based on the relationship, and calculates the time interval indicated by the DRX timer based on the time unit. In this way, it is possible to reach a common understanding between a network device and a terminal device of the time duration indicated by the DRX timer when the UE supports multiple numerologies/TTI lengths. As such, communication between the network device and the terminal device can be performed based on the common understanding of the DRX timer.

Figure 2:
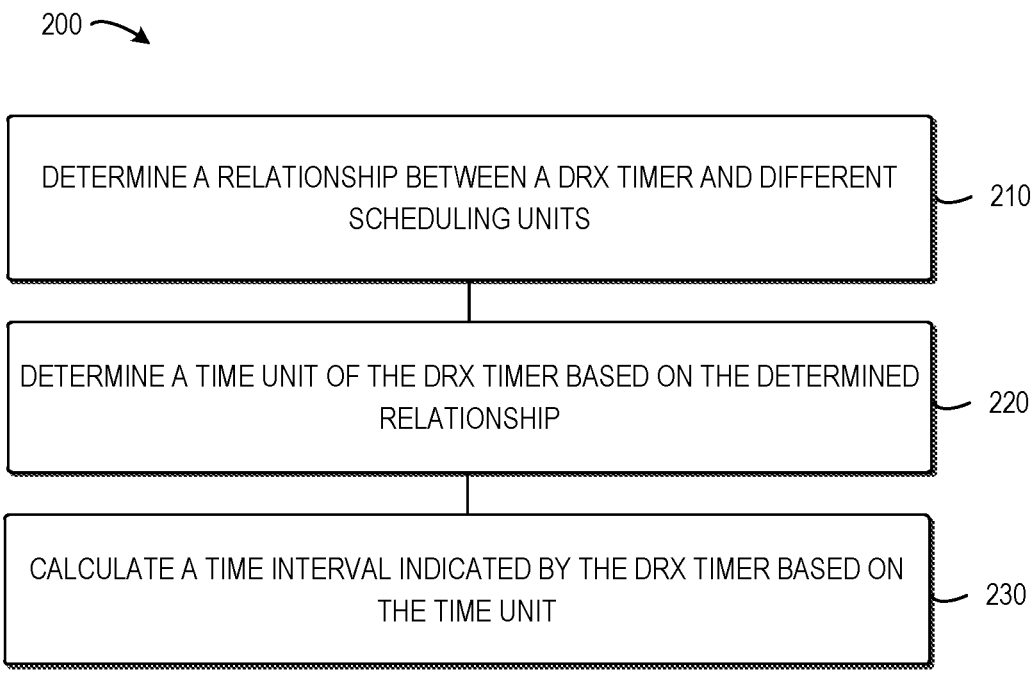
FIG. 2 shows a flowchart of a method 200 of determining configuration of a DRX timer in accordance with an embodiment of the present disclosure.

More details of embodiments of the present disclosure will be discussed with reference to FIGS. 2 to 6 below. FIG. 2 shows a flowchart of a method 200 of transmitting downlink control information in accordance with an embodiment of the present disclosure. With the method 200, the above and other potential deficiencies in the conventional approaches can be overcome. It would be appreciated by those skilled in the art that the method 200 may be implemented by a wireless device, such as a network device 101, a terminal device 102, or other suitable devices.

The method 200 is entered at 210, where the wireless device determines a relationship between a DRX timer and different scheduling units. The different scheduling units are associated with a plurality of numerologies. The numerology indicates a frequency spacing configuration of subcarrier in wireless communication system. The DRX timer as discussed may include a variety of timers associated with DRX, for example, but not limited to, onDurationTimer, drx-InactivityTimer, drx-RetransmissionTimer, longDRX-CycleStartOffset, shortDRX-Cycle, drxShortCycleTimer, drx-ULRetransmissionTimer, HARQ RTT timer, UL HARQ RTT timer, and so on. It is understood that a time unit of a DRX timer may be the same as or different from the time unit of another DRX timer.

In some embodiments, the relationship between the DRX timer and the different scheduling units may indicate whether the DRX timer needs to be aligned with respect to the different scheduling units. Thus, at 210, the wireless device may determine whether the DRX timer needs to be aligned with respect to the different scheduling units. In embodiments of the present disclosure, when DRX timers are related to a Media Access Control (MAC) entity which is shared by different scheduling units/numerologies, it may be determined that these DRX timers need to be aligned to enable the network device and the terminal device to reach a common understanding about the DRX timers, so as to simplify the effort at both of the network device and the terminal device to maintain DRX related timers.

As for DRX timers such as onDurationTimer, drx-InactivityTimer, drxShortCycleTimer, shortDRX-Cycle, and longDRX-CycleStartOffset, which are used to define per MAC entity behavior and are irrelevant to different scheduling units/numerologies, it may be determined that these DRX timer need to be aligned with respect to different scheduling units to define per MAC entity behavior.

As for the DRX timers such as drx-RetransmissionTimer, drx-ULRetransmissionTimer, HARQ RTT timer, and UL HARQ RTT timer, since they are used to define per transmission per HARQ process behavior within a UE, and since different carriers using different numerologies share one MAC entity in carrier aggregation (CA) but using different HARQ entities, it is reasonable to not align these timers to define HARQ behavior.

In some embodiments, it may be determined that onDurationTimer, drx-InactivityTimer, drxShortCycleTimer, shortDRX-Cycle, and longDRX-CycleStartOffset belong to a first group which needs be aligned, which means that the time units of these DRX timers are independent on different scheduling units associated with different numerologies, while drx-RetransmissionTimer, drx-ULRetransmissionTimer, HARQ RTT timer, and UL HARQ RTT timer belong to a second group which does not need be aligned, which means that the time units of these DRX timers are dependent on different scheduling units associated with different numerologies.

At 220, the wireless device determines a time unit of the DRX timer based on the determined relationship.

In some embodiments, if the DRX timer belongs to the first group, such as onDurationTimer, drx-InactivityTimer, drxShortCycleTimer, shortDRX-Cycle, or longDRX-Cycle-StartOffset, it may be determined from the relationship that the DRX timer needs to be aligned with respect to the different scheduling units. In this case, the wireless device may determine the time unit of the DRX timer as a predefined value. The predefined value may be an absolute value, for example, 1 ms, which is irrelevant to the numerologies. Thus, when onDurationTimer is set to 5, it means that the wireless device may be active for 5 ms in on Duration.

Alternatively, the wireless device may determine the time unit of the DRX timer based on a predefined numerology. The predefined numerology may be a fixed reference numerology that is irrelevant to the numerologies currently used by the wireless device. For example, assuming the predefined numerology for Synchronization Signal (SS) block transmission has a subcarrier spacing of 15 kHz, even a wireless device is currently using a numerology having a subcarrier spacing of 30 kHz (also referred to as "a 30 kHz numerology" hereafter), when onDurationTimer is set to 5, it can be determined that the time unit is 1 ms corresponding to the 15 kHz numerology, instead of 0.5 ms corresponding to the 30 kHz numerology. As such, it may be determined that the DRX timer indicates that the wireless device will be active for 5 ms, instead of 2.5 ms.

As a further alternative, the wireless device may determine the time unit of the DRX timer based on a currently used numerology. In this case, the wireless device may obtain information about numerologies used by a primary cell (PCell) and a secondary cell (SCell) of the wireless device, and determine the time unit of the DRX timer based on the numerology used by the primary cell. In this way, the time unit can be determined dynamically according to the current used numerology. By way of example, assuming a UE is currently using both 15 kHz and 30 kHz numerologies and the PCell is using the 15 kHz numerology, then the time unit is determined according to the 15 kHz numerology. Thus, when onDurationTimer is set to 5, it can be determined that the time unit is 1 ms corresponding to the 15 kHz numerology, and the UE will be active for 5 ms. If later the UE uses a 30 kHz numerology in PCell and a 60 kHz numerology in SCell, then it can be determined that the time unit is 0.5 ms corresponding to the 30 kHz numerology, and the UE will be active for 2.5 ms.

As a still further alternative, the wireless device may determine the time unit of the DRX timer based on an indication configured by and received from a network device. In this case, the wireless device may be a terminal device and may send a request for configuration of the time unit to the network device. The network device may configure the time unit for the DRX timer and send it to the terminal device via an indication. The indication may be transmitted in any suitable message or signaling, such as a Radio Resource Control (RRC) signaling. The indication may indicate a value of the time unit configured by the network device. Thus, the terminal device may determine the time unit of the DRX timer as the value indicated by the indication.

In addition to the above embodiments, if the DRX timer is for example drx-RetransmissionTimer, drx-ULRetransmissionTimer, HARQ RTT timer, or UL HARQ RTT timer, it may be determined that the DRX timer does not need to be aligned with respect to the different scheduling units. In this case, the DRX timer is bundled to the numerologies/TTI lengths scheduled by the wireless device. A same value may be configured for a DRX timer with respect to different numerologies/TTI lengths, but the time unit of the DRX timer may be interpreted differently depending on the numerology/TTI duration that is currently used by the wireless device.

In an embodiment, the time unit may be determined per carrier. That is, the DRX timers may be interpreted differently for different carriers using different numerologies. In particular, the wireless device may obtain information about numerologies used by different carriers, and determine time units of the DRX timer for the different carriers based on the numerologies. In an example, a UE is using carrier aggregation of two carriers, a 15 kHz numerology being used in carrier C1 and a 30 kHz numerology being used in carrier C2. If the DRX timer, for example, drx-Retransmisison-Timer, is set to 4, it may be determined that the time unit of the DRX timer is 1 ms for carrier C1. Thus, it can be determined that the DRX timer indicates a time interval of 4 ms for a HARQ process in carrier C1. On the other hand, for a HARQ process in C2, it may be determined that the time unit of the DRX timer is 0.5 ms, and the DRX timer indicates a time interval of 2 ms.

In a further embodiment, the time unit may be determined per Hybrid Automatic Repeat request (HARQ) process. In other words, the DRX timer may be interpreted differently for different HARQ processes in one HARQ entity. That is, a time unit of a DRX timer may be dependent on a configuration of a scheduling unit associated with a HARQ process in different HARQ processes. More specifically, the wireless device may obtain information about scheduling units used by different HARQ processes, and determine time units of the DRX timer for the different HARQ processes based on the information about scheduling units. In an example, a UE is scheduled with different TTI lengths for different HARQ processes in one carrier. Assuming that SCS is 15 kHz (that is, a 15 kHz numerology) and the DRX timer (for example, drx-RetransmisisonTimer) is set to 4, if the UE has a scheduling unit of 7 OFDM symbols for HARQ process ID 1, which is a half of the LTE scheduling unit including 14 OFDM symbols, then the time unit of the DRX timer may be determined as a half of the subframe length, namely, 0.5 ms. As such, the DRX timer indicates a time interval of 2 ms for HARQ process ID 1. If the UE is scheduled with a 14-OFDM symbol TTI on HARQ process ID 2, the time unit of the DRX timer may be determined as 1 ms and the DRX timer indicates a time interval of 4 ms for HARQ process ID 2.

In a still further embodiment, the time unit may be determined per HARQ transmission of a HARQ process from different HARQ processes, which means that the time unit of DRX timer may be dependent on a configuration of a HARQ retransmission in the HARQ process. In other words, the DRX timers may be interpreted differently for different HARQ transmission attempts in one HARQ process of one HARQ entity. More specifically, the wireless device may obtain information about scheduling units used by different HARQ transmissions in a HARQ process, and determine time units of the DRX timer for the different HARQ transmissions based on the information about scheduling units. In an example, if a UE is scheduled with different scheduling units (i.e., TTI lengths) for the same HARQ process in one carrier. If the UE is using a 15 kHz numerology and the DRX timer (e.g., drx-Retransmisison-Timer) is set to 4, and if the UE is scheduled with a 7-OFDM symbol initial transmission for a HARQ process ID 1, the time unit of the DRX timer may be determined as a half of the subframe length, namely, 0.5 ms. As such, the DRX timer indicates a time interval of 2 ms for the initial transmission of the HARQ process ID 1. If later the UE is rescheduled with a 14-OFDM symbol TTI for retransmission of the same HARQ process ID 1, the time unit of the DRX timer may be determined as 1 ms and the DRX timer indicates a time interval of 4 ms for the retransmission of the HARQ process ID 1.

At 230, the wireless device calculates a time interval indicated by the DRX timer based on the time unit. According to embodiments of the present disclosure, the time interval may be calculated by multiplex the value of the DRX timer, for example, a numerical value of 4, and the time unit of the DRX timer, for example, 1 ms. Thus, the time interval can be calculated as 4 ms.

It is to be understood that this example is illustrated for discussion, rather than suggesting any limitation. Those skilled in the art would appreciate that there are many other ways for calculating the time interval based on the time unit. For example, the calculation may be performed by introducing a weight or a factor predefined according to system requirements, standards or specifications, network conditions, and/or the like.

In view of the forgoing, for a DRX timer in the first group, the wireless device may interpret the DRX timer as a single value which is the same for all numerologies used by the wireless device. For the DRX timer in the second group, the wireless device may interpret the DRX timer as multiple values which are different for different numerologies used by the wireless device.

Compared with the conventional solutions, by determining a time unit of a DRX timer based on the relationship between the DRX timer and different scheduling units, it is possible to reach a common understanding between a network device and a terminal device of the time duration indicated by the DRX timer when multiple numerologies/TTI lengths are supported. As such, communication between the network device and the terminal device can be performed based on the common understanding of the DRX timer. As a result, transmission efficiency and network performance can be effectively improved.

Figure 3:
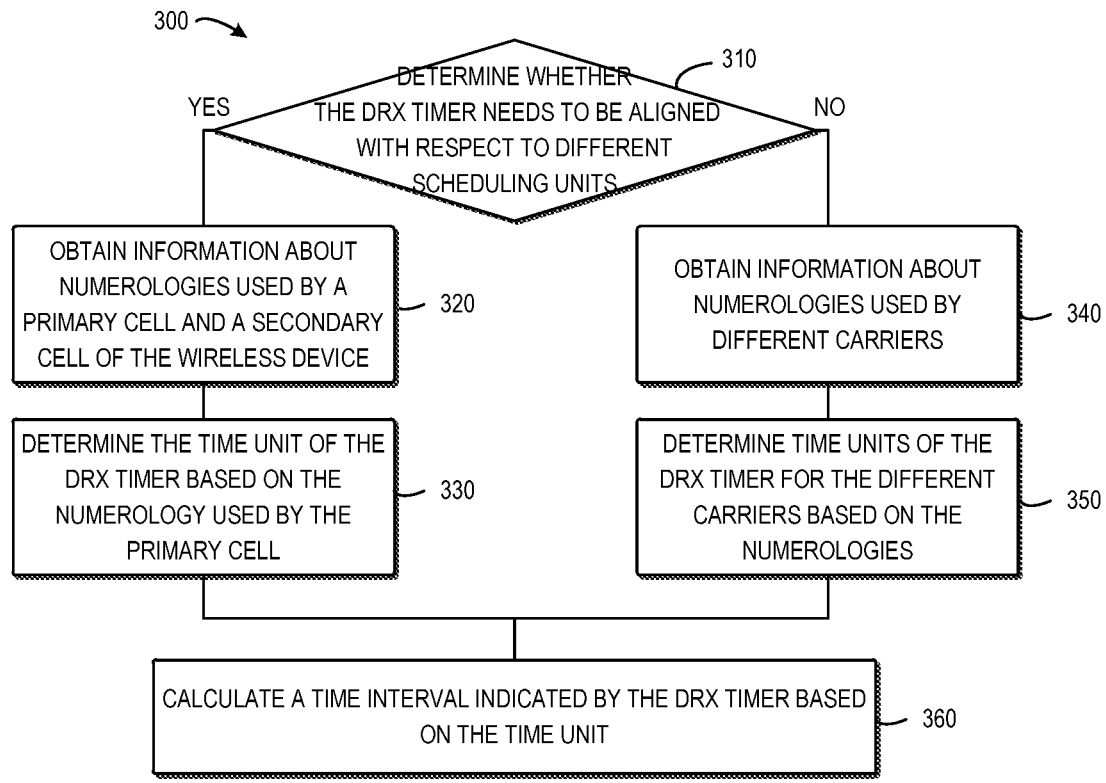
FIG. 3 shows a flowchart of a method 300 of determining configuration of a DRX timer in accordance with an embodiment of the present disclosure.

FIG. 3 shows a flowchart of a method 300 of determining configuration of a DRX timer in accordance with an embodiment of the present disclosure. The method 300 may be considered as further implementations of the method 200. In the embodiment described with respect to FIG. 3, if the DRX timer needs to be aligned with respect to the different scheduling units, the wireless device determines the time unit of the DRX timer based on a numerology currently used in PCell. Otherwise, the wireless device determines the time unit for different carriers using different numerologies. It is to be understood that the method 300 are just described for example, rather than suggesting any limitations.

At 310, it is determined whether the DRX timer needs to be aligned with respect to the different scheduling units. If yes, the method 300 proceeds to 320, where the wireless device obtains information about numerologies used by a primary cell and a secondary cell of the wireless device. At 330, the wireless device determines the time unit of the DRX timer based on the numerology used in the PCell.

On the other hand, if the DRX timer does not need to be aligned with respect to the different scheduling units, the wireless device obtains information about numerologies used by different carriers at 340. At 350, the wireless device determines time units of the DRX timer for the different carriers based on the numerologies.

At 360, the wireless device calculates a time interval indicated by the DRX timer based on the time unit. This block is similar as the block 230 and thus details are omitted.

In this way, the DRX timer may be classified in two groups and the wireless device may interpret the DRX timer differently according to which group it belongs to. For the first group, the wireless device may interpret it as having the same absolute time interval across multiple numerologies/scheduling units. For the second group, the wireless device may interpret it as having different absolute time intervals across multiple numerologies/scheduling units.

Figure 4A:
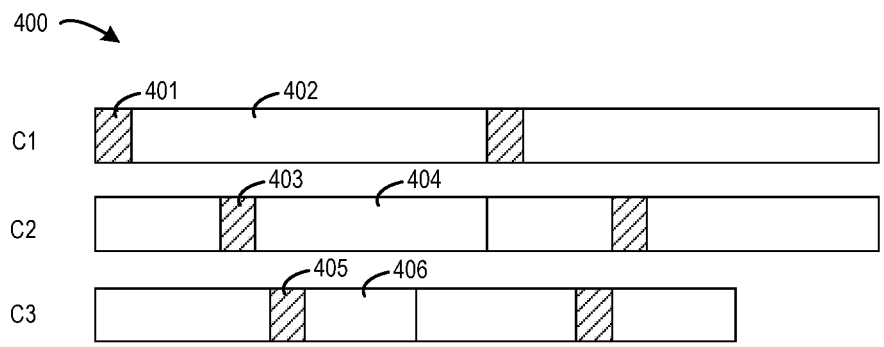
FIG. 4A shows a diagram 400 of configuration of a DRX timer for different carriers using different numerologies according to the prior art.

To better understand embodiments of the present disclosure, comparison is made between solutions of the prior art and embodiments of the present disclosure as follows. FIG. 4A shows a diagram 400 of configuration of a DRX timer for different carriers using different numerologies according to the prior art. As shown in FIG. 4A, there are three carriers C1, C2 and C3 using three different numerologies, namely, 15 kHz, 30 kHz and 60 kHz, respectively. In the example of FIG. 4A, when different carriers using different numerologies, the DRX timer of carriers C1, C2 and C3 has different On durations 401, 403 and 405, respectively, and different Sleep durations 402, 404 and 406, respectively. This would either cause a mismatching issue because the network device and the terminal device cannot have a common understanding about the DRX timer of carriers C1, C2 and C3, or cause more power consumption at the terminal device when the terminal device needs to operate DRX on a per carrier base not per MAC entity base.

Figure 4B:
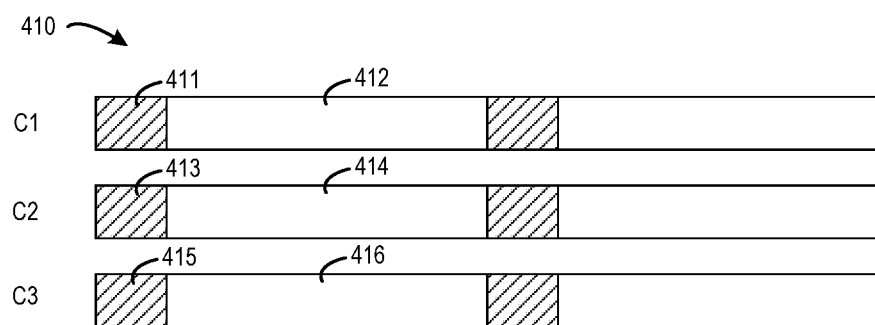
FIG. 4B shows a diagram 410 of configuration of a DRX timer for different carriers using different numerologies in accordance with an embodiment of the present disclosure.

FIG. 4B shows a diagram 410 of configuration of a DRX timer for different carriers using different numerologies in accordance with an embodiment of the present disclosure. In the example of FIG. 4B, when different carriers C1, C2 and C3 using different numerologies, the DRX timer of carriers C1, C2 and C3 has the same On durations 411, 413 and 415, respectively, and the same Sleep durations 412, 414 and 416, respectively. Thus, a common understanding of the DRX timer may be achieved for different carriers according to embodiments of the present disclosure.

Figure 5:
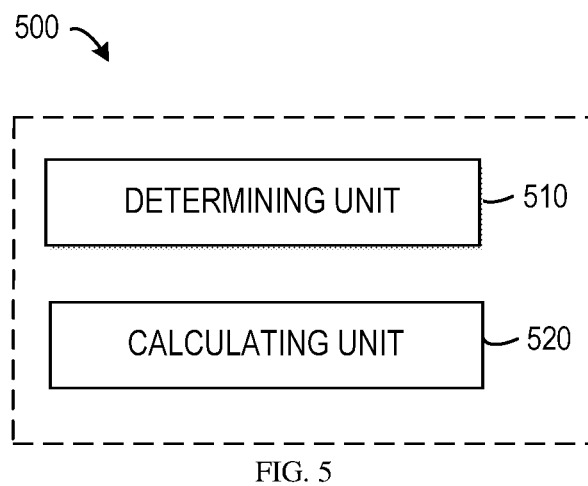
FIG. 5 shows a block diagram of an apparatus 500 implemented at a wireless device in accordance with an embodiment of the present disclosure.

Now reference is made to FIG. 5, which shows a block diagram of an apparatus 500 in accordance with an embodiment of the present disclosure. It would be appreciated that the apparatus 500 may be implemented at a wireless device, for example, the network device 101, the terminal device 102, or any other suitable device.

As shown, the apparatus 500 includes a determining unit 510 and a calculating unit 520. The determining unit 510 is configured to: determine a relationship between a DRX timer and different scheduling units, and determine a time unit of the DRX timer based on the determined relationship. The calculating unit 520 is configured to calculate a time interval indicated by the DRX timer based on the time unit.

In an embodiment, the determining unit 510 may be further configured to: determine whether the DRX timer needs to be aligned with respect to the different scheduling units.

In an embodiment, the determining unit 510 may be further configured to: in response to determining that the DRX timer needs to be aligned with respect to the different scheduling units, performing at least one of: determine the time unit of the DRX timer as a predefined value; determine the time unit of the DRX timer based on a predefined numerology; determine the time unit of the DRX timer based on a currently used numerology; and determine the time unit of the DRX timer based on an indication received from a network device, the indication indicating a value of the time unit configured by the network device.

In an embodiment, the determining unit 510 may be further configured to: obtain information about numerologies used by a primary cell and a secondary cell of the wireless device; and determine the time unit of the DRX timer based on the numerology used by the primary cell.

In an embodiment, the determining unit 510 may be further configured to: in response to determining that the DRX timer does not need to be aligned with respect to the different scheduling units, obtain information about numerologies used by different carriers; and determine time units of the DRX timer for the different carriers based on the numerologies.

In an embodiment, the determining unit 510 may be further configured to: in response to determining that the DRX timer does not need to be aligned with respect to the different scheduling units, obtain information about scheduling units used by different Hybrid Automatic Repeat request, HARQ, processes; and determine time units of the DRX timer for the different HARQ processes based on the information about scheduling units.

In an embodiment, the determining unit 510 may be further configured to: in response to determining that the DRX timer does not need to be aligned with respect to the different scheduling units, obtain information about scheduling units used by different Hybrid Automatic Repeat request, HARQ, transmissions in a HARQ process; and determine time units of the DRX timer for the different HARQ transmissions based on the information about scheduling units.

It should be appreciated that components included in the apparatus 500 correspond to the operations of the methods 200-300. Therefore, all operations and features described above with reference to FIGS. 2-3 are likewise applicable to the components included in the apparatus 500 and have similar effects. For the purpose of simplification, the details will be omitted.

The components included in the apparatus 500 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the components included in the apparatus 500 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In accordance with embodiments of the present disclosure, there is provided an apparatus implemented at a wireless device. The apparatus includes: means for determining a relationship between a discontinuous reception, DRX, timer and different scheduling units; means for determining a time unit of the DRX timer based on the determined relationship; and means for calculating a time interval indicated by the DRX timer based on the time unit.

In an embodiment, the means for determining the relationship of the DRX timer and different scheduling units comprises: means for determining whether the DRX timer needs to be aligned with respect to the different scheduling units.

In an embodiment, the means for determining the time unit of the DRX timer comprises: means for, in response to determining that the DRX timer needs to be aligned with respect to the different scheduling units, performing at least one of: determining the time unit of the DRX timer as a predefined value; determining the time unit of the DRX timer based on a predefined numerology; determining the time unit of the DRX timer based on a currently used numerology; and determining the time unit of the DRX timer based on an indication received from a network device, the indication indicating a value of the time unit configured by the network device.

In an embodiment, the means for determining the time unit of the DRX timer based on a currently used numerology comprises: means for obtaining information about numerologies used by a primary cell and a secondary cell of the wireless device; and means for determining the time unit of the DRX timer based on the numerology used by the primary cell.

In an embodiment, the means for determining the time unit of the DRX timer comprises: means for in response to determining that the DRX timer does not need to be aligned with respect to the different scheduling units, obtaining information about numerologies used by different carriers; and means for determining time units of the DRX timer for the different carriers based on the numerologies.

In an embodiment, the means for determining the time unit of the DRX timer comprises: means for in response to determining that the DRX timer does not need to be aligned with respect to the different scheduling units, obtaining information about scheduling units used by different Hybrid Automatic Repeat request, HARQ, processes; and means for determining time units of the DRX timer for the different HARQ processes based on the information about scheduling units.

In an embodiment, the means for determining the time unit of the DRX timer comprises: means for, in response to determining that the DRX timer does not need to be aligned with respect to the different scheduling units, obtaining information about scheduling units used by different Hybrid Automatic Repeat request, HARQ, transmissions in a HARQ process; and means for determining time units of the DRX timer for the different HARQ transmissions based on the information about scheduling units.

Figure 6:
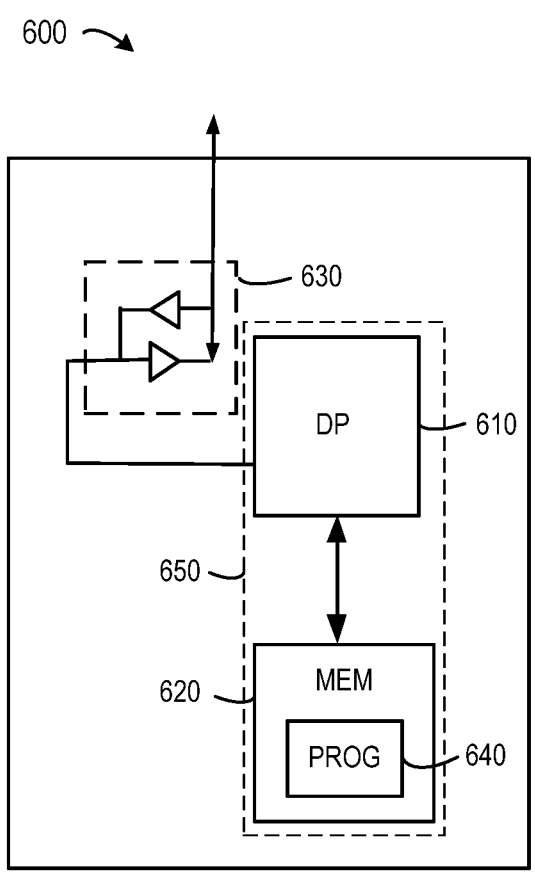
FIG. 6 shows a simplified block diagram 600 of a wireless device that is suitable for use in implementing embodiments of the present disclosure.

FIG. 6 shows a simplified block diagram of a wireless device 600 that is suitable for implementing embodiments of the present disclosure. It would be appreciated that the wireless device 600 may be implemented as at least a part of, for example, the network device 101 or the terminal device 102.

As shown, the wireless device 600 includes a communicating means 630 and a processing means 650. The processing means 650 includes a data processor (DP) 610, a memory (MEM) 620 coupled to the DP 610. The communicating means 630 is coupled to the DP 610 in the processing means 650. The MEM 620 stores a program (PROG) 640. The communicating means 630 is for communications with other devices, which may be implemented as a transceiver for transmitting/receiving signals.

In some embodiments, the processing means 650 may be configured to determine a relationship between a discontinuous reception, DRX, timer and different scheduling units; determine a time unit of the DRX timer based on the determined relationship; and calculate a time interval indicated by the DRX timer based on the time unit.

The PROG 640 is assumed to include program instructions that, when executed by the associated DP 610, enable the wireless device 600 to operate in accordance with the embodiments of the present disclosure, as discussed herein with the methods 200-300. The embodiments herein may be implemented by computer software executable by the DP 610 of the wireless device 600, or by hardware, or by a combination of software and hardware. A combination of the data processor 610 and MEM 620 may form processing means 650 adapted to implement various embodiments of the present disclosure.

The MEM 620 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the wireless device 600, there may be several physically distinct memory modules in the wireless device 600. The DP 610 may be of any type suitable to the local technical environment, and may include one or more of general purpose computers, special purpose computers, microprocessors, digital signal processors (DSPs) and processors based on multicore processor architecture, as non-limiting examples. The wireless device 600 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a wireless device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. The machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the wireless device may be implemented in the general context of computer system-executable instructions, such as program modules, being executed by a computer system. Generally, program modules may include routines, programs, objects, components, logic, data structures, and so on that perform particular tasks or implement particular abstract data types. The wireless device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a wireless device, comprising:
   determining a first time unit of a discontinuous reception (DRX) timer for a first Hybrid Automatic Repeat request (HARQ) process operating on a first carrier based on a first numerology used in the first carrier;
determining a first time interval indicated by the DRX timer based on the first time unit, the first time interval being associated with a first duration of time for the DRX timer;
determining a second time unit of the DRX timer for a second HARQ process operating on a second carrier based on a second numerology used in the second carrier; and
determining a second time interval indicated by the DRX timer based on the second time unit, the second time interval being associated with a second duration of time for the DRX timer.

2. The method of claim 1, wherein the determination of the second time interval comprises:
determining the second time interval indicated by the DRX timer being associated with the second duration of time different from the first duration of time based on the second numerology different from the first numerology.

3. The method of claim 1, wherein each of the first time unit and the second time unit is associated with one of a drx-RetransmissionTimer and a drx-ULRetransmissionTimer.

4. The method of claim 1, wherein the first carrier and the second carrier share one media access control (MAC) entity in carrier aggregation.

5. The method of claim 1, wherein each of the first time unit and the second time unit is associated with a HARQ round trip time (RTT) timer of a respective HARQ process.

6. The method of claim 1, wherein the determination of the first time interval comprises:
determining the first time interval indicated by the DRX timer being associated with the first duration of time when the first numerology is currently used, and determining the first time interval indicated by the DRX timer being associated with the first duration of time when a third numerology different from the first numerology is currently used.

7. The method of claim 6, wherein each of the first time unit and the second time unit is associated with one of an onDurationTimer, a drx-InactivityTimer, a drxShortCycleTimer, a shortDRX-Cycle, and a longDRX-CycleStartOffset.

8. The method of claim 1, wherein the wireless device is a network device or a terminal device.

9. A wireless device, comprising:
a processor, and
a non-transitory machine-readable medium coupled to the processor and storing instructions that when executed by the processor, are to cause the wireless device to perform:
determining a first time unit of a discontinuous reception (DRX) timer for a first Hybrid Automatic Repeat request (HARQ) process operating on a first carrier based on a first numerology used in the first carrier;
determining a first time interval indicated by the DRX timer based on the first time unit, the first time interval being associated with a first duration of time for the DRX timer;
determining a second time unit of the DRX timer for a second HARQ process operating on a second carrier based on a second numerology used in the second carrier; and
determining a second time interval indicated by the DRX timer based on the second time unit, the second time interval being associated with a second duration of time for the DRX timer.

10. The wireless device of claim 9, wherein the determination of the second time interval comprises:
determining the second time interval indicated by the DRX timer being associated with the second duration of time different from the first duration of time based on the second numerology different from the first numerology.

11. The wireless device of claim 9, wherein each of the first time unit and the second time unit is associated with one of a drx-RetransmissionTimer and a drx-ULRetransmissionTimer.

12. The wireless device of claim 9, wherein the first carrier and the second carrier share one media access control (MAC) entity in carrier aggregation.

13. The wireless device of claim 12, wherein each of the first time unit and the second time unit is associated with a HARQ round trip time (RTT) timer of the HARQ process.

14. The wireless device of claim 9, wherein the determination of the first time interval comprises:
determining the time interval indicated by the DRX timer being associated with the first duration of time when the first numerology is currently used, and determining the time interval indicated by the DRX timer being associated with the first duration of time when a third numerology different from the first numerology is currently used.

15. The wireless device of claim 14, wherein each of the first time unit and the second time unit is associated with one of an onDurationTimer, a drx-InactivityTimer, a drxShortCycleTimer, a shortDRX-Cycle, and a longDRX-CycleStartOffset.

16. The wireless device of claim 9, wherein the wireless device is a network device or a terminal device.

17. A non-transitory machine-readable medium having instructions stored thereon, the instructions, when executed by at least one processor, are to cause the at least one processor to perform:
determining a first time unit of a discontinuous reception (DRX) timer for a first Hybrid Automatic Repeat request (HARQ) process operating on a first carrier based on a first numerology used in the first carrier;
determining a first time interval indicated by the DRX timer based on the first time unit, the first time interval being associated with a first duration of time for the DRX timer;
determining a second time unit of the DRX timer for a second HARQ process operating on a second carrier based on a second numerology used in the second carrier; and
determining a second time interval indicated by the DRX timer based on the second time unit, the second time interval being associated with a second duration of time for the DRX timer.

18. The non-transitory machine-readable medium of claim 17, wherein the determination of the second time interval comprises:
determining the second time interval indicated by the DRX timer being associated with the second duration of time different from the first duration of time based on the second numerology different from the first numerology.

19. The non-transitory machine-readable medium of claim 17, wherein each of the first time unit and the second time unit is associated with one of a drx-RetransmissionTimer and a drx-ULRetransmissionTimer.

20. The non-transitory machine-readable medium of claim 17, wherein the first carrier and the second carrier share one media access control (MAC) entity in carrier aggregation.

* * * * *